March 11, 1930.  O. N. FARLEY  1,750,585
STEERING DEVICE
Filed Dec. 21, 1927
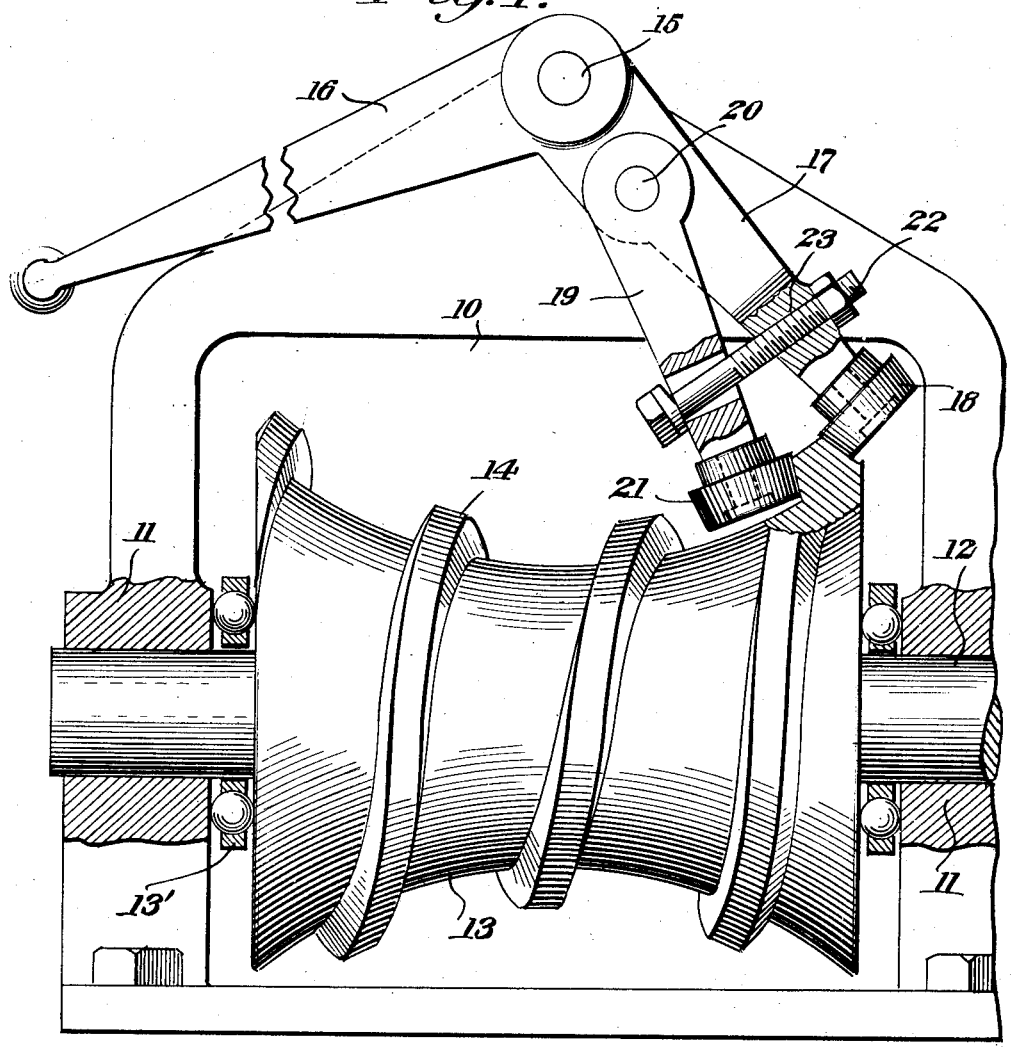
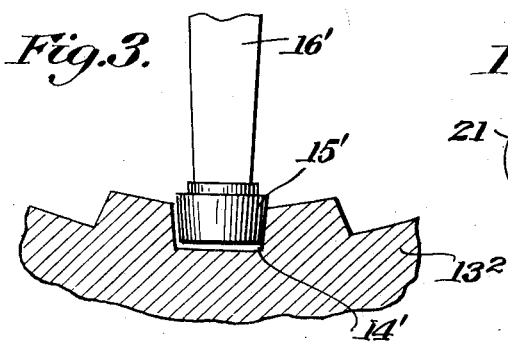
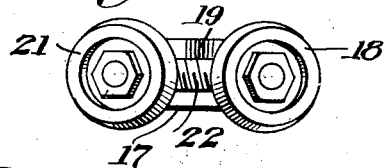
Otis N. Farley INVENTOR
BY Victor J. Evans
ATTORNEY Patented Mar. 11, 1930

1,750,585

UNITED STATES PATENT OFFICE

OTIS N. FARLEY, OF LYNDEN, WASHINGTON

STEERING DEVICE

Application filed December 21, 1927. Serial No. 241,645.

This invention relates to steering devices adapted for use upon motor vehicles.

An object of the invention comprehends a concaved worm.

Another object of the invention contemplates teeth spirally arranged upon the worm.

A further object of the invention embodies a steering arm adapted for connection with the teeth upon the worm.

More specifically stated the steering arm is provided with bearing surfaces adapted to receive and engage the worm teeth therebetween.

The invention further consists of means adapted to afford adjustment to the steering arm to take up play and lost motion at the connecting end thereof between the bearing surfaces and teeth.

With the above and other objects in view, the invention further consists of the following novel features and details of construction, to be hereinafter more fully described, illustrated in the accompanying drawings and pointed out in the appended claim.

In the drawing:

Figure 1 is a fragmentary longitudinal sectional view taken through my novel form of steering device.

Figure 2 is an end elevation of the steering arm and means of adjustment therefor.

Figure 3 is a fragmentary elevation of the modification of my invention.

Referring to the drawing in detail, wherein like characters of reference denote corresponding parts, the reference character 10 indicates a boxing or housing provided with bearing members 11 adapted to journal appropriate portions of the steering post 12. A concaved worm 13 carried by the steering post 12 is disposed between the respective bearings 11 and adapted for rotation between thrust bearings 13′. The bearings may be of any well known type or of a type adapted for journaling working parts of steering devices. A worm tooth 14, spirally arranged upon the concaved outer surfaces of the worm 13, is pitched for alignment with a center which will be presently described. A pivot 15 being employed for a steering arm 16, the latter having an arm 17 provided with a tapered roller bearing member 18 upon the extremity thereof and which is adapted for engagement with one side of the tooth 14. An arm 19 having pivotal connection, as indicated at 20 upon the arm 17, is also provided with a bearing member 21 adapted for engagement with the opposite side of the tooth 14 diametrically opposed to that of the bearing member 18. An adjusting screw or bolt 22, carried by the pivot arm 19, is adapted for threaded engagement within a bore 23 in the arm 17 to regulate the tension of the bearing members against the tooth and to facilitate adjustment when the bearing members and tooth have become worn incident to use. By reason of the fact that the tooth 14, at the several positions indicated, is pitched for alignment with a common center, such as indicated at 20, the arm 17 will dispose the same bearing surface against the tooth through the entire swinging action of the steering arm whereby binding action will be obviated and greater ease in steering facilitated.

It is obviously understood that the configuration of the steering arm may be altered from that of a bell crank lever and disposed the pivot connection, in the form of a shaft, through the chassis bar of a vehicle and to support a stub steering arm or pitman shaft upon the other end thereof in the event the device is used upon vehicles having longitudinally operable connecting rods.

The steering arms may also be disposed upon laterally shifting connecting rods.

In Figure 3 of the drawings, I have illustrated a modification of the invention, embodying a concaved worm gear $13^2$, having spirally arranged grooves 14′ in contradistinction to the teeth 14, as employed in the preferred form of the invention. The side walls of the groove being obliquely disposed to conveniently accommodate a tapered roller bearing 15′ rotatably mounted upon one end of a steering arm 16′.

If desired, an arm, not shown, pivoted upon the arm 16′, after the manner of the arm 19, may be employed to race within the groove 14' and to abut the separating wall between the two arms, namely, 17 and 19, as illustrated in Figure 1 of the drawing.

The invention is susceptible of various changes in its form, proportions and minor details of construction, and the right is herein reserved to make such changes as properly fall within the scope of the appended claim.

Having thus described the invention, what is claimed is:—

A steering device comprising a concaved worm gear, the tooth for the gear being spaced for greater distances than the usual and pitched toward a common center, a steering arm pivotally mounted at the common center having one end disposed in juxtaposition to the tooth, a bearing member carried upon the particular end of the steering member and adapted for engagement with one side of the tooth, an arm being pivotally connected with the aforementioned end of the steering arm, having a bearing member upon the extremity thereof engageable with the tooth in diametrically opposed relation to the first mentioned bearing, and a bolt member carried by the pivoted arm and adapted for threaded engagement with the aforementioned end of the steering arm to afford adjustment between the bearing members and tooth.

In testimony whereof I affix my signature.

OTIS N. FARLEY.